United States Patent
Harner

[11] 3,758,764
[45] Sept. 11, 1973

[54] TURBINE POWER PLANT CONTROL WITH AN ON-LINE OPTIMIZATION CONTROL

[75] Inventor: Kermit I. Harner, Windsor, Conn.

[73] Assignee: United Aircraft Corporation, East Hartford, Conn.

[22] Filed: Oct. 29, 1970

[21] Appl. No.: 85,046

[52] U.S. Cl............ 235/150.2, 235/150.1, 60/39.28
[51] Int. Cl............................ G05b 13/02, F02 F02c
[58] Field of Search..................... 235/151.1, 151.3, 235/150.2; 60/39.28, 242, 233

[56] References Cited
UNITED STATES PATENTS

| | | |
|---|---|---|
| 2,842,108 | 7/1958 | Sanders....................... 235/150.1 X |
| 3,096,471 | 7/1963 | Taylor.......................... 235/150.1 X |
| 3,377,848 | 4/1968 | Marvin...................... 60/39.28 R X |
| 3,472,027 | 10/1969 | Snow et al. ................ 60/39.28 R X |

OTHER PUBLICATIONS

"Self-Organizing Control of Advanced Turbine Engines" by Barron et al., 8–1969, Technical Abstract Bulletin 60-20, Oct. 15, 1969, No. AD–857–616, National Technical Information Service.

Primary Examiner—Eugene G. Botz
Attorney—Norman Friedland

[57] ABSTRACT

Means for speeding up the assessment and optimization process for a turbine engine control including a factor that estimates the change in steady state fuel flow required to maintain the desired thrust level.

5 Claims, 3 Drawing Figures $$AR = \frac{A5}{A5\ NOM}$$

TURBINE POWER PLANT CONTROL WITH AN ON-LINE OPTIMIZATION CONTROL

The invention herein described was made in the course of or under a contract or subcontract thereunder with the Department of the Air Force.

BACKGROUND OF THE INVENTION

This invention relates to a control system for turbo-type of power plant of the type having at least one or both variable turbine inlet nozzles and variable area exhaust nozzles, in combination with a self-organizing control system utilized for optimizing thrust specific fuel consumption at all thrust conditions by producing maximum cycle and propulsive efficiency.

The turbine type of power plant in current use today is generally of fixed geometry and that the only variable that affects control, performance and power of the engine is the quantity of fuel fed to the burner section. It is customary to provide in such a fuel control, sensors that monitor certain power plant operating conditions so as to schedule fuel flow to produce a desired thrust or power plant operating condition. Such heretofore known fuel controls serve to schedule the steady state and acceleration and/or deceleration operating conditions in order to prevent overtemperature, surge, rich and lean blowouts. These controls are designed with a predetermined schedule reflecting the engine's performance characteristics. While such schedules attempt to optimize fuel consumption and engine operating efficiency, they nonetheless are subjected to the preascertained performance criteria which may deteriorate after continuous usage of the power plant.

Since the advent of high performance turbine type of power plants which not only include the adjustable fuel flow but also include variable engine geometry such as variable turbine nozzles and variable exhaust nozzles, the problem of designing a fuel control that will achieve optimum fuel consumption is obviously more complex. To this end, this invention relates to a system directed at achieving optimum thrust specific fuel consumption (TSFC) by controlling the thrust of the turbine power plant in a deterministic manner by adjusting fuel flow and to optimize TSFC in an "adaptive" manner by adjusting engine geometry. While the term adaptive in the context of this specification is illustrated by the self-organizing control system described in U.S. Pat. No. 3,460,096 granted to R. L Barron on Aug. 5, 1969 it is not limited thereto. In this type of system, power plant variables have characteristics which may be unknown and difficult to predict are continuously monitored during transient and steady state operating conditions to adjust fuel flow, turbine nozzle area, and exhaust nozzle area to experimentally calculate the performance of the power plant in order to "zero in" on the optimum TSFC. The self-organizing control system is utilized solely to control the geometry of the turbine power plant by providing a search for system parameter values during quasi steady state conditions for optimizing the engine's performance. The fundamental design of the controller incorporates the probability state variable search algorithm which is suitable for simultaneous adjustments in multiple parameters. The self-organizing control system includes a performance assessment unit which in part employs differentiation or difference techniques and logic for computing a binary performance value signal (V) which indicates if trends are favorable or adverse.

In the preferred embodiment of the self-organizing control system, a performance assessment unit receives measures of fuel flow and thrust changes to compute if TSFC is increasing or decreasing so as to make the determination independently of any thrust transients resulting from power lever changes or environmental factors.

Correlation logic units of the self-organizing controller implement the parameter search under the guidance of the performance assessment unit for optimum engine areas or other parameter values being optimized. The basic design of the crrelation logic correlation incorporates the probability state variable (PSV) search algorithm. This algorithm is suited for simultaneous adjustment for two or more parameters, providing the performance assessment unit has capabilities for resolving the very small performance differences which are obtained in the proximity of the optimum in the space of parameters. The correlation logic units are employed in alternating adjustments of the parameters for which the problem of performance resolution is greatly alleviated. In this instance a two state search is utilized in which simultaneous parameter adjustments are first made to bring the system close to its optimum state in the minimum of time after which alternating adjustments are made to effect fine tuning. The correlation logic units receive the value signal V calculated in the performance assessment unit and correlates this signal with information as to the polarity of the immediate past search experiment. In the PSV search mode, a correlation signal biases a centered (zero-mean) random variable, the polarity of the resulting biased random variable being detected to find the sense of the next experiment, and all correlation logic units generate output changes simultaneously at a prescribed frequency or asynchronously. In the alternating search mode, the correlation signal is detected without going through summation with a random variable and only one correlation logic unit generates an output change at a time, with each correlation logic unit taking its turn in a prescribed manner.

In order to evaluate whether a given change in an engine variable will increase or decrease T.S.F.C. usually requires that the transient resulting from the disturbance be allowed to decay to essentially steady state conditions before an accurate assessment can be made. If the change in thrust and fuel flow are evaluated before the system has reached an equilibrium condition, erroneous conclusions can be reached.

By including a weighting term in the assessment which accounts for the fact that any engine rotor acceleration which is present at the time the assessment is made will eventually be converted to an additional thrust increment, it is possible to speed up to the assessment and optimization process. The estimation of the change in steady state fuel flow required to maintain the desired thrust level as engine variables are manipulated can therefore be written as $$\Delta W_{f_{\text{est}}} = \Delta W_f - (TSFC) \Delta F_n - K \Delta \dot{N}$$

SUMMARY OF THE INVENTION

The primary object of this invention is to provide an improved self-organizing control system.

Another object of this invention is to provide for a jet engine control system having a self-organizing control means for more accurately assessing T.S.F.C. by evaluating fuel flow requirements during transient conditions.

A still further object of this invention is to provide means to maintain the desired thrust level in an SOC fuel control by controlling in accordance with the expression $$\Delta W_{f_{cal}} = \Delta W_f - (TSFC) \Delta F_n - K \Delta \dot{N}$$

Other features and advantages will be apparent from the specification and claims and from the accompanying drawings which illustrate an embodiment of the invention.

DESCRIPTION OF THE PREFERRED EMBODIMENT

Figure 1:
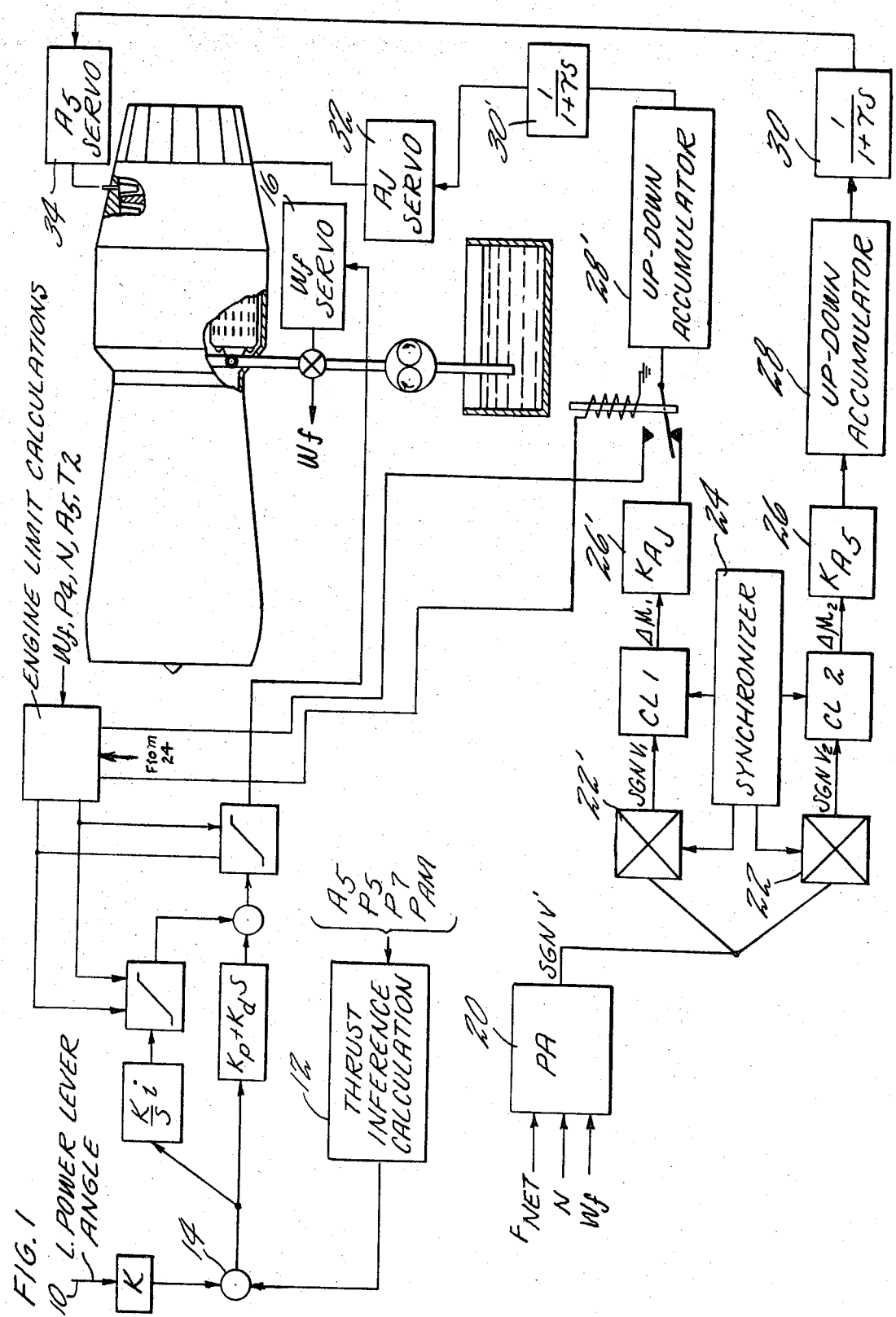
FIG. 1 is a block diagram of the control system for turbine type power plant showing the preferred embodiment of this invention.

As used herein the Definition of Symbols are as follows:

- $A_5$ = turbine nozzle area
- $A_{5\ NOM}$ = nominal turbine nozzle area
- $A_{5\ REF}$ = desired turbine nozzle area
- $A_J$ = exhaust nozzle area
- $A_{J\ REF}$ = desired exhaust nozzle area
- $C_P$ = specific heat of gases
- $k$ = ratio of specific heats
- $K_{AJ}$ = change in exhaust nozzle area per unit output from SOC correlation logic unit
- $K_{A5}$ = change in turbine nozzle area per unit output from SOC correlation logic unit
- $K_d$ = inferred thrust control derivative gain
- $K_i$ = inferred thrust control integral gain
- $K_p$ = inferred thrust control proportional gain
- $M$ = aircraft Mach number
- $N$ = rotor rpm
- $\dot{N}$ = time rate of change of rotor rpm
- Pam = ambient pressure
- $P_2$ = compressor inlet pressure
- $P_4$ = compressor discharge pressure
- $P_5$ = turbine inlet pressure
- $P_7$ = turbine discharge pressure
- $q_f$ = heating value of fuel
- $T_2$ = compressor inlet temperature
- $T_4$ = compressor discharge temperature
- $T_5$ = turbine inlet temperature
- $T_7$ = turbine discharge temperature
- $W_a$ = compressor airflow
- $W_f$ = main engine fuel flow
- $W_{f\ REF}$ = desired main engine fuel flow
- $W_g$ = gas flow = $W_a + W_f$
- $\nu_b$ = burner efficiency
- $\nu_c$ = compressor efficiency
- $\nu_n$ = exhaust nozzle adiabatic expansion efficiency
- $\nu_t$ = turbine efficiency
- $\theta_2$ = ratio of compressor inlet temperature to standard day temperature
- $F_g$ = gross engine thrust
- $F_{NET}$ = net engine thrust
- $J$ = mechanical equivalent of heat
- $g$ = acceleration due to gravity
- $f, f_1, f_2$ = function of parameters
- $\Delta T_{SOC}$ = time interval for updating SOC control outputs While in the heretofore known turbine type of power plant the problem of measuring the actual thrust is difficult, the problem is more complicated in the advanced type of engines where the engine geometry is varied. Unlike engines where the geometry is fixed measurement of compressor speed, for example, would be more indicative of thrust than would otherwise be in this type of advanced engine. To this end, the present invention utilizes a calculated inferred thrust by computing certain engine operating parameters.

To lend clarity to the understanding of this invention, the present portion of the disclosure is directed to a simplified calculation for obtaining an inferred thrust reference signal (all symbols are defined hereinabove).

A reasonable expression for gross thrust of a turbojet with variable turbine nozzle area is given by:

$$(1)\ F_g = W_g \sqrt{2 J \nu_n C_p T_7/g [1 - (P_{am}/P_7)^{(k-1)/k}]}_{1/2}$$

Gas flow, $W_g$, can be expressed as a function of the conditions entering the turbine as follows:

$$(2)\ W_g = (A_5 P_5 / \sqrt{T_5}) f (P_7/P_5)$$

where $f(P_7/P_5)$ relates the turbine flow parameter to turbine pressure ratio.

Since it is impossible to get a reasonable measurement of $T_5$, $W_g$ can also be expressed in terms of the pressure and temperature downstream of the turbine, i.e., $$W_g = (A_5 P_7/\sqrt{T_7})(P_5/P_7)\{1 - \nu T [1-(P_7/P_5)^{(k-1)/k}]\}^{1/2} f(P_7/P_5)$$

or $$(3)\ W_g = (A_5 P_7/\sqrt{T_7}) f_1 (P_7/P_5)$$

where $$f_1(P_7/P_5) = f(P_7/P_5) \cdot (P_5/P_7) \{1 - \nu_T [1-(P_7/P_5)^{(k-1)/k}]\}^{1/2}$$

Substituting equation 3 into 1 yields $$(4)\ F_g = A_5 P_7 f_1 (P_7/P_{P5}) \sqrt{2 J \nu_n C_p/g [1 - (P_{am}/P_7)^{(k-1)/k}]}_{1/2}$$

or, in its expanded form $$(4a)\ F_g = A_5 P_7 \sqrt{2 J \nu_n C_p/g} [1 - (P_{am}/P_7)^{(k-1)/k}]^{1/2}$$
$$f (P_7/P_5)(P_5/P_7) \{1 - \nu_T [1-(P_7/P_5)^{(k-1)/k}]\}^{1/2}$$

where:

$$\nu_T = f(A_5, P_7/P_5)$$

$f(P_7/P_5)$ = turbine nozzle flow parameter

In summary the jet engine thrust will be inferred from the measurement of $A_5$, $P_7$, $(P_7/P_5)$ and $(P_{am}/P_7)$ as follows:

$$(5)\ F_g = P_7 f_2 (A_5, P_7/P_5) f (P_{am}/P_7)$$

As noted from FIG. 1, the power lever signal 10 is compared with the thrust inference calculated signal 12 in a suitable electronic summer 14 for producing an error signal indicative of the difference between the desired and inferred thrust values which signal is then sent through a proportional plus integral plus derivative controller utilized to operate the system in the following manner.

The signal generated by the proportional plus integral plus derivative controller, i.e., fuel flow reference ($W_{fREF}$) is transmitted to the fuel control 16 which may take the form of any suitable fuel metering valve to adjust fuel flow metered to the engine so as to provide the thrust necessary to minimize the error signal.

Figure 2:
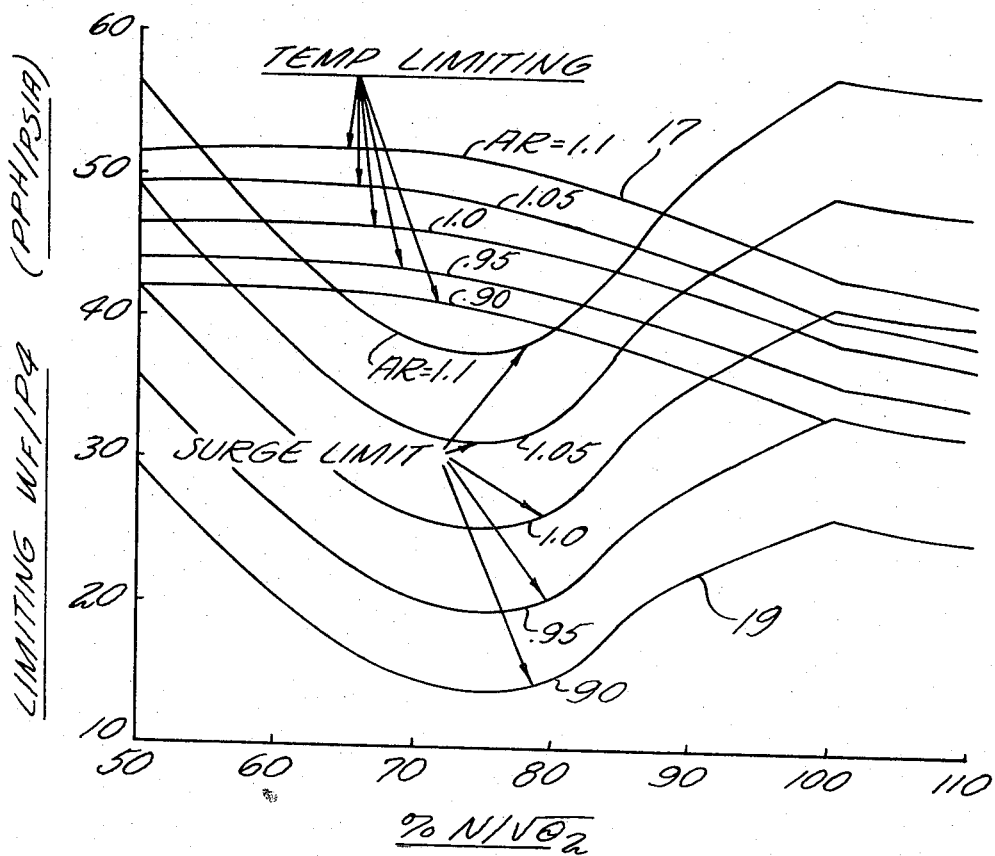
FIG. 2 is a graphical illustration defining a typical curve showing the surge and temperature limit for variable turbine nozzle areas.

So as to prevent overtemperature and surge during acceleration, it is contemplated to limit the fuel flow rate by calculating the limits and adjust the $W_{f\ REF}$ signal accordingly. A better understanding of the limits necessary in this embodiment to prevent surge and maximum turbine inlet temperature can be had by referring to FIG. 2. FIG. 2 defines the surge and temeprature limiting $W_f/P_4$ characteristics for an engine with variable turbine nozzle area. The temperature limiting curves 17 are for a 60° F compressor inlet temperature and 2,300° R turbine inlet temperature and the surge limits are shown as curves 19, being plotted for percentage of corrected compressor speed ($N/\sqrt{\theta_2}$).

While a rigorous mathematical computation would be necessary to show that surge and temperature can be ascertained by combining $W_f/P_4 \sqrt{\theta_2}$, $N/\sqrt{\theta_2}$, and $A_5$ as control parameters, as will be obvious to one skilled in this art, the following computations will show the validity of the use of these parameters.

For choked turbine nozzles the following equation can be written (1) $W_g \sqrt{T_5}/A_5 P_5 = k_1$ Also, it is known that (2) $W_g = W_a(1 + W_f/W_a)$ Therefore, by rearrangement we can write $$\frac{W_a\sqrt{T_2}}{P_2} \frac{\sqrt{\frac{T_5}{T_2}}\left(1+\frac{W_f}{W_a}\right)}{\left(\frac{P_4}{P_2}\right)\left(\frac{P_5}{P_4}\right)A_5} = k_1$$

or (3) $$\frac{P_4}{P_2} = \frac{\left(1+\frac{W_f}{W_a}\right)\sqrt{\frac{T_5}{T_2}}}{k_1\left(\frac{P_5}{P_4}\right)A_5}\frac{W_a\sqrt{T_2}}{P_2}$$

Figure 3:
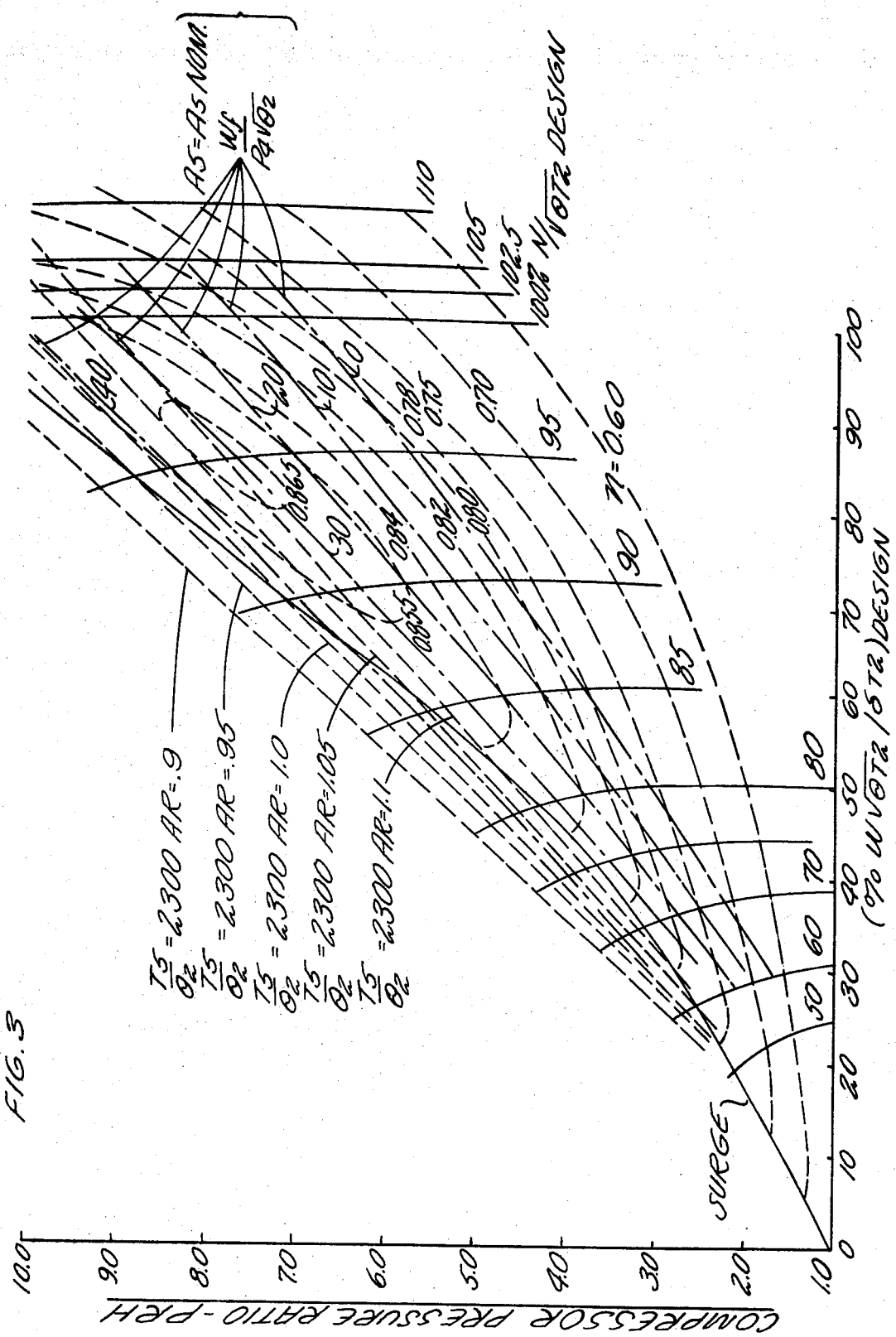
FIG. 3 is a graph illustrating a typical compressor map.

Since $(1 + W_f/W_a)$, $k_1$, and $P_5/P_4$ are essentially constant, it can be seen that lines of constant $(1/A_5)\sqrt{T_5/T_2}$ can be super-imposed upon the compressor map shown in FIG. 3. These lines define a constant relationship between pressure ratio and corrected inlet airflow over the region where the turbine nozzles are choked.

From the burner equations the following equation can be written (4) $W_a C_p (_5 - T_4) = W_f \nu_b q_f$ or (4a) $T_5/T_2 = T_4/T_2 + (W_f \nu_b q_f/W_a C_p T_2)$ From the compressor equation the following can be defined (5) $T_4/T_2 = 1 + (1/\eta_c)[P_4/P_2)^{(k-1)=k} - 1]$ Substituting equation 5 into equation 4a and rearranging $$\frac{W_f \eta_b q_f}{W_a C_p T_2} = \frac{W_f}{P_4\sqrt{T_2}} \frac{\eta_b q_f \left(\frac{P_4}{P_2}\right)}{\left(\frac{W_a\sqrt{T_2}}{P_2}\right)C_p}$$

yields (6)
$$\frac{T_5}{T_2} = 1 + \frac{1}{\eta_c}\left[\left(\frac{P_4}{P_2}\right)^{\frac{k-1}{k}} - 1\right] + \frac{W_f}{P_4\sqrt{T_2}} \frac{\eta_b q_f \left(\frac{P_4}{P_2}\right)}{\left(\frac{W_a\sqrt{T_2}}{P_2}\right)C_p}$$

Substitution of equation 6 into 3 and solving for $W_f/P_4 \sqrt{T_2}$ yields (7)
$$\frac{W_f}{P_4\sqrt{T_2}} = \frac{k_1{}^2\left(\frac{P_5}{P_4}\right)^2 C_p A_5{}^2\left(\frac{P_4}{P_2}\right)}{\left(1+\frac{W_f}{W_a}\right)^2 \eta_b q_f \left(\frac{W_a\sqrt{T_2}}{P_2}\right)}$$

$$\frac{C_p\left\{1+\frac{1}{\eta_c}\left[\left(\frac{P_4}{P_2}\right)^{\frac{k-1}{k}} - 1\right]\right\}\left(\frac{W_a\sqrt{T_2}}{P_2}\right)}{\eta_b q_f \left(\frac{P_4}{P_2}\right)}$$

Since $k_1$, $(P_5/P_4)$, $C_p$, $(1 + W_f/W_a)$, $\nu$ b, and $q_f$ are all nearly constant, it can be seen that $W_f/P_4 \sqrt{T_2}$ is uniquely defined for each point on the compressor map (see FIG. 3) provided $A_5$ is known. From equation 7 and the compressor map it is then possible to calculate $W_f/P_4 \sqrt{T_2}$ along the surge line for any value of $A_5$. With a combination of equation 3 and 7 it is also possible to define the limiting value of $W_f/P_4$ as a function of $A_5$, N and $T_2$ to provide the desired limiting turbine inlet temperature.

FIG. 3 shows locus of constant corrected turbine inlet temperature (i.e., $T_5/\theta_2$) for various $(A_5/A_{5\ NOM})$ and lines of constant $W_f/P_4 \sqrt{\theta_2}$ for $A_5 = A_{5\ NOM}$.

Obviously, to provide a theoretically correct temperature limit it is necessary to define that limit as a function of N and $T_2$ for a given turbine nozzle area and then provide a biasing function as the area varies from its nominal value. From the data evaluated to date a reasonable temperature limited value of $W_f/P_4$ can be defined from:

$(W_f/P_4)_{LIM} = (W_f/P_4)_{LIM\ AT\ NOM\ AREA} + K\ [(A_5 - A_5\ NOM)/A_{5\ NOM}]$

As an alternative it is contemplated to calculate for the maximum and minimum turbine areas and adjust for points in between by making a linear interpolation between the high and low area values.

The concept of a self-organizing control (SOC) consists of a continuous series of experiments performed by making small perturbations of the independent variables to be optimized. The system performance is then evaluated after each experiment to determine if the overall performance has been improved or degraded as a result of the perturbation. The control binary logic is designed to provide a reward (or penalty) binary signal from the computed improved (or degraded) performance assessment (PA). A reward signal causes the trend of perturbations in the future experiments to occur in the same direction that caused the reward. In a similar manner, a penalty signal causes the trend of perturbations in the future experiments to occur in the opposite direction. The continuous search for improved performance will result in the engine variables being adjusted, as required, to achieve the best performance. After having reached the best performance, the experiments will continue to occur but remain in the vicinity of the best performance.

It is obvious that the detailed mechanization of this concept can be done in various ways with a varying amount of complexity and sophistication.

In the preferred embodiment as can be seen from FIG. 1 and being one of the simplest mechanizations perturbs one variable at a time, then determine the resulting performance improvement (or degradation). After every variable, in turn, has been perturbed and a performance assessment for each has been determined, the sequence is repeated. The direction of the perturbation of each variable is determined by the preceding perturbation of that variable and the resulting computed performance assessment.

In FIG. 1, the PA module 20 is designed to assess thrust specific fuel consumption, TSFC, where TSFC = $W_f$/Thrust. As would be obvious to one skilled in this art, it is evident that the PA module may be designed to provide a performance assessment of other parameters. The PA module receives signals from $\Delta F_{NET}$, $W_f$, N and computes a binary signal, SGN V', as follows:

$$V' = [a(\Delta F_{NET} - \Delta F_{NET}^{-1}) - b107 (W_f - W_f^{-1}) + C(\dot{N} - \dot{N}^{-1})]$$

$$\text{SGN } V' = +1 \text{ if } V' > 0$$

$$\text{SGN } V' = -1 \text{ if } V' < 0$$

where $\Delta F_{NET}^{-1}$, $W_f^{-1}$, and $\dot{N}^{-1}$ are the values of $\Delta F_{NET}$, $W_f$, and $\dot{N}$ that were sensed one time interval ($\Delta T_{SOC}$) prior to sensing $\Delta F_{NET}$, $W_f$, N. Rewriting equation 1 and dividing by the term (−1) puts the equation in the form:

(2) $\Delta W_{f(est)} = \Delta W_f - (TSFC) \Delta F_n - K \Delta \dot{N}$

Although a sensed $\Delta F_{NET}$ is not normally available, a satisfactory substitute may be obtained from sensed aircraft acceleration and known aircraft mass in a conventional manner. During the time interval, $\Delta T_{SOC}$, the sensed $\Delta F_{NET}$ changes from $\Delta F_{NET}^{-1}$ to $\Delta F_{NET}$. Similarly sensed $W_f$ changes from $W_f^{-1}$ to $W_f$ and $\dot{N}$ (being the instantaneous time derivative of sensed N) changes from $\dot{N}^{-1}$ to $\dot{N}$. It is evident that a $\Delta F_{NET} > \Delta F_{NET}^{-1}$ will cause V' to increase whereas $W_f > W_f^{-1}$ will cause V' to decrease. The appropriately weighted sum of ($\Delta F_{NET} - \Delta F_{NET}^{-1}$) and ($W_f - W_f^{-1}$) will yield a V'>0 when thrust specific fuel consumption, $W_f/F_{NET}$, has improved (decreased), whereas V'>0 if the thrust specific fuel consumption has degraded (increased). It is important to note that $\Delta T_{SOC}$ must be sufficiently long to permit the engine to be at steady state to obtain an accurate assessment if the V' is based only on $\Delta F_{NET}$ and $W_f$ as described above. The minimum permissible $\Delta T_{SOC}$ is predominantly determined by the engine rotor dynamic lag, such that $\Delta T_{SOC}$ must be at least 10 seconds at lower power. The $\Delta T_{SOC}$ can be significantly reduced if the computation of V' is modified to include a weighted value of ($\dot{N} - \dot{N}^{-1}$). The weighted value of ($\dot{N} - \dot{N}^{-1}$) is indicative of the amount of system performance being used to accelerate or decelerate the engine rotor that will ultimately appear as an increment in thrust. Hence, including ($\dot{N} - \dot{N}^{-1}$) in the computation of V' results in V' being equal to the steady state value before steady state conditions are actually achieved.

The synchronizer 24 establishes the time at which the signal, SGN V', is transmitted to each correlation logic unit (CL). The synchronizer in conjunction with the signal, SGN V', determines SGN $V_1$ and SGN $V_2$ by sampling SGN V' at the appropriate time.

A correlation logic unit evaluates the preferred direction of the next perturbation, $\Delta \mu$, based on the past $\Delta \mu$ (i.e. $\Delta \mu^{-1}$) and the resulting SGN V. $\Delta \mu$ is a binary signal indicating the preferred direction of the next perturbation (+1 means to perturb +1; −1 means to perturb −1 ). Thus, $\Delta \mu^{-1}$ is the value of $\Delta \mu$ determined in the preceding time interval. This can be mechanized by a simple multiplication of binary signals as shown:

$$\Delta \mu_1 = (\text{SGN } V_1) ( \Delta \mu_1^{-1})$$

$$\Delta \mu_2 = (\text{SGN } V_2) (\Delta \mu_2^{-1})$$

As can be seen in FIG. 1 there are two correlation logic units CL1 for $A_J$ and CL2 for $A_5$. There is always one correlation logic unit for each independent variable in the SOC. The synchronizer establishes the time of the next perturbation in $\Delta \mu$. $\Delta \mu_1$ and $\Delta \mu_2$ are perturbed alternately at time intervals of $\Delta T_{SOC}$.

The constants, $K_{A_J}$ and $K_{A_5}$ represented by blank box 26 + 26', scale the binary signals $\Delta \mu_1$ and $\Delta \mu_2$ respectively, to provide the desired perturbation magnitude in $\Delta A_J$ and $\Delta A_5$.

The SOC control of $A_J$ has provision for alternate control logic when engine limits have occurred. In particular, when overspeed occurs, the perturbations in $\Delta A_J$ are always toward decreased $A_J$ to aid in eliminating overspeed and also permit the control to operate at the desired thrust and at maximum speed. The perturbations of $A_J$ in this alternate mode have a magnitude of $\Delta A_J''$.

The up-down accumulators 28 + 28' collect and store the sum of all perturbations. The first order lags, included in smoothing filters 30 + 30' following the up-down accumulators, are optional providing smoothing of the discrete steps in the up-down accumulator. These signals, $A_{J\ REF}$ and $A_{5\ REF}$, are the reference (or input) for the $A_J$ and $A_5$ servos 32 + 34 respectively. The servo actuators adjust the engine geometry $A_J$ and $A_5$ in response to $A_{J\ REF}$ and $A_{5\ REF}$ in a conventional manner.

A slightly more sophisticated SOC control, being a modification of the preceding SOC description can search out the best operating conditions faster when an SOC control has many independent variables. All the independent variables are perturbed simultaneously and the computed SGN V' is the result of these combined perturbations. The computing mechanism for the SOC is not shown here for the sake of clarity, simplicity, and convenience, but for further details reference should be made to U.S. Pat. No. 3,460,096.

Only the correlation logic units and synchronizer describer previously are modified; hence, only the operation of these units will be described here. The signal, SGN V', is continuously transmitted to every correlation logic unit, CL. The synchronizer establishes the time of the next perturbation in the $\Delta\mu$. Generally the synchronizer is designed to cause a perturbation from every CL to occur simultaneously.

The CL first evaluates the preferred direction of the next perturbation, $\Delta\mu$, based on the past $\Delta\mu$ and SGN V' resulting from the simultaneous perturbations (in a manner such as described previously). This signal is smoothed in a filter such as a first order dynamic lag. A noise generator in each CL provides a random signal which is added to the output signal from this filter. The next perturbation, $\Delta\mu$, is in the direction of the sign of this resulting signal. It can be seen that the $\Delta\mu$ from each CL tends to be in the direction yielding improved performance in the past several experiments. However, the non-deterministic manner used in computing each $\Delta\mu$ causes various combinations of $\Delta\mu$ perturbations to occur. Each CL will tend toward providing a $\Delta\mu$ that has provided improved performance in the past several experiments. The overall effect is that all independent variables tend to be adjusted simultaneously toward yielding the best performance.

It should be understood that the invention is not limited to the particular embodiments shown and described herein, but that various changes and modifications may be made without departing from the spirit or scope of this novel concept as defined by the following claims.

I claim:

1. In a self-organizing control system for a turbine type of power plant having a compressor and variable area mechanisms, said system having performance assessment means responsive to power plant operating parameters for assessing the performance of said power plant, correlation logic means responsive to the performance assessment means for adjusting the performance by varying said variable area mechanism in a phase relationship, said performance assessment means including the rate of change of said compressor so that the performance assessment is made during a transient condition of the power plant.

2. In a self-organizing control system as claimed in claim 1 wherein said adjusting means includes the control of said turbine type of power plant, the power assessment means for assessing the performance includes an N term and the estimated change in fuel flow resulting after a transient at a given thrust level is given by the equation:

$$\Delta W_{f_{estimate}} = \Delta W_f - (TSFC) \Delta F_n - K \Delta \dot{N}$$

where
$K =$ a constant
$W_f =$ fuel flow
$TSFC =$ thrust specific fuel consumption
$F_n =$ net engine thrust
$\dot{N} =$ rate of change of speed 3. A fuel control for a turbine type of power plant having a compressor and variable area geometry in combination with a self-organizing control having means for assessing the performance of said power plant, fuel metering means having its independent control, means for ascertaining the net thrust of said power plant, said self-organizing control including power assessment means responsive to said fuel metering means, said net thrust ascertaining means and the rate of change of the speed of said compressor wherein said rate of change of the speed of said compressor serves to speed up the response time of said power assessment means.

4. A fuel control as claimed in claim 3 wherein said variable area geometry includes the exhaust nozzles and turbine stator vanes of the power plant, adjusting means for positioning said stator vanes and exhaust nozzle, said performance assessment means includes a $\dot{N}$ term and the estimated change in fuel flow after a transient at a given thrust level is given by the equation:

$$\Delta W_{f_{estimate}} = \Delta W_f - (TSFC) \Delta F_n - K \Delta \dot{N}$$

where
$K =$ a constant
$W_f =$ fuel flow
$TSFC =$ thrust specific fuel consumption
$F_n =$ net engine thrust
$\dot{N} =$ rate of change of speed 5. A self-organizing control as claimed in claim 3 including a correlation logic unit responsive to said performance assessment means for determining the phase relationship of the signal generated by said performance assessment means and a synchronizer establishing the time interval of said correlation logic unit for performing experiments on the performance of said power plant by perturbations of said variable area geometry.

* * * * *

PO-1050
(5/69)

UNITED STATES PATENT OFFICE
CERTIFICATE OF CORRECTION

Patent No. __3,758,764__  Dated __September 11, 1973__

Inventor(s) __Kermit I. Harner__

It is certified that error appears in the above-identified patent and that said Letters Patent are hereby corrected as shown below:

| | |
|---|---|
| Column 2, line 12, | "crrelation" should read --correlation-- |
| Column 3, line 61, | "$V_b$" should read -- $\eta_b$ -- |
| Column 3, line 62, | "$V_c$" should read -- $\eta_c$ -- |
| Column 3, line 63, | "$V_n$" should read -- $\eta_n$ -- |
| Column 3, line 64, | "$V_t$" should read -- $\eta_t$ -- |
| Column 4, line 51, | after "(k-1)/k" delete -- 1 -- |
| Column 4, line 52 | "$1 - V_T$" should read --$1 - \eta_T$-- |
| Column 5, line 35, | "$w_a (1 + W_f/W_a$" should read -- $W_a (1 + W_f/W_a)$ -- |
| Column 5, line 64, | "$(5 - T_4)$" should read -- $(T_5 - T_4)$ -- |
| Column 5, line 64, | "$V_b$" should read -- $\eta_b$ -- |
| Column 5, near line 67, | "$V_b$" should read -- $\eta_b$ -- |
| Column 6, line 38, | "$V_b$" should read -- $\eta_b$ -- |

PO-1050
(5/69)

UNITED STATES PATENT OFFICE
CERTIFICATE OF CORRECTION

Patent No. 3,758,764          Dated September 11, 1973

Inventor(s) Kermit I. Harner

It is certified that error appears in the above-identified patent and that said Letters Patent are hereby corrected as shown below:

Column 7, line 37,     delete "107"

Column 7, line 60,     "V' $>$ 0" should read -- V' $<$ 0 --

Signed and sealed this 26th day of March 1974.

(SEAL)
Attest:

EDWARD M. FLETCHER, JR.　　　　　　　　C. MARSHALL DANN
Attesting Officer　　　　　　　　　　　　Commissioner of Patents Notice of Adverse Decision in Interference In Interference No. 100,445, involving Patent No. 3,758,764, I. Harner, TURBINE POWER PLANT CONTROL WITH AN ON-LINE OPTIMIZATION, final judgment adverse to the patentee was rendered May 5, 1982, as to claims 1 and 3.

[*Official Gazette August 17, 1982.*]